(12) United States Patent
Fukumura et al.

(10) Patent No.: US 8,128,504 B2
(45) Date of Patent: Mar. 6, 2012

(54) CONSTANT VELOCITY UNIVERSAL JOINT

(75) Inventors: Yoshikazu Fukumura, Iwata (JP); Hisaaki Kura, Iwata (JP); Shin Tomogami, Iwata (JP); Tohru Nakagawa, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 326 days.

(21) Appl. No.: 12/308,103

(22) PCT Filed: Apr. 12, 2007

(86) PCT No.: PCT/JP2007/058092
§ 371 (c)(1),
(2), (4) Date: Dec. 8, 2008

(87) PCT Pub. No.: WO2007/145019
PCT Pub. Date: Dec. 21, 2007

(65) Prior Publication Data
US 2009/0162134 A1 Jun. 25, 2009

(30) Foreign Application Priority Data

Jun. 16, 2006 (JP) .................................. 2006-167826
Jun. 16, 2006 (JP) .................................. 2006-167830

(51) Int. Cl.
*F16D 3/223* (2011.01)
*F16D 1/072* (2006.01)
(52) U.S. Cl. .......................... 464/145; 464/906; 403/282
(58) Field of Classification Search .................... 464/15, 464/106, 139, 141, 142, 145, 904, 906, 182; 403/274, 277, 279–282, 359.1–359.6
See application file for complete search history.

(56) References Cited

U.S. PATENT DOCUMENTS

| | | | | | |
|---|---|---|---|---|---|
| 3,209,437 | A | * | 10/1965 | Voorhies, Carl | 403/282 |
| 3,579,794 | A | * | 5/1971 | Powell | 403/281 |
| 4,118,134 | A | * | 10/1978 | Mansel | 403/282 |
| 4,728,216 | A | * | 3/1988 | Disborg | 403/282 |

(Continued)

FOREIGN PATENT DOCUMENTS

GB 1 537 800 1/1979
(Continued)

OTHER PUBLICATIONS

Machine Translation of JP2003-009615.*
(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

An inner joint component and a shaft of a constant velocity universal joint are connected in a configuration it difficult for backlash to occur. An axis hole inner diameter of an inner member of the constant velocity universal joint is unhardened, and a spline serving as a recess and projection section running along a circumferential direction is formed on an axial end outer diameter of the shaft. A hardened layer n is formed on the axial end outer diameter of the shaft. The shaft and the inner member are joined by an axial end of the shaft being pressed into the axis hole inner diameter of the inner member to incuse a shape of said recess and projection section onto the axis hole inner diameter of the inner member 20.

20 Claims, 12 Drawing Sheets

U.S. PATENT DOCUMENTS

| | | | |
|---|---|---|---|
| 5,290,203 A * | 3/1994 | Krude | 464/145 |
| 6,332,844 B1 * | 12/2001 | Hayama et al. | 464/145 |
| 6,506,122 B2 * | 1/2003 | Nakagawa et al. | 464/145 |
| 6,971,177 B2 * | 12/2005 | Ozawa et al. | 403/280 |
| 7,172,510 B2 * | 2/2007 | Fuhrmann et al. | 464/906 |
| 2002/0195291 A1 | 12/2002 | Nonogaki | |
| 2003/0081872 A1 | 5/2003 | Sahashi et al. | |
| 2003/0151223 A1 | 8/2003 | Ozawa et al. | |
| 2005/0172755 A1 | 8/2005 | Burgler | |
| 2005/0272510 A1 | 12/2005 | Nakagawa et al. | |
| 2007/0037626 A1 * | 2/2007 | Yamazaki | 464/142 |
| 2007/0049382 A1 * | 3/2007 | Ishijima et al. | 464/145 |

FOREIGN PATENT DOCUMENTS

| | | |
|---|---|---|
| JP | 51-162958 | 12/1976 |
| JP | 52-2245 | 1/1977 |
| JP | 8-68426 | 3/1996 |
| JP | 2001-18605 | 1/2001 |
| JP | 2003-4060 | 1/2003 |
| JP | 2003-202033 | 7/2003 |
| JP | 2003-314580 | 11/2003 |
| JP | 2005-9615 | 1/2005 |
| JP | 2005-193757 | 7/2005 |
| JP | 2005-534876 | 11/2005 |
| JP | 2005-337306 | 12/2005 |
| JP | 2006-96346 | 4/2006 |

OTHER PUBLICATIONS

Machine Translation of JP2003-314580.*
Machine Translation of JP2005-193797.*
"Forging." Mechanical Engineering Design Guide. Engineer's Handbook. Web. Jan. 12, 2011. <http://www.engineershandbook.com/MfgMethods/forging.htm>.*
International Preliminary Report on Patentability mailed Dec. 31, 2008 for International Application No. PCT/JP2007/058092.
Written Opinion of the International Searching Authority mailed Dec. 31, 2008 for International Application No. PCT/JP2007/058092.
Supplementary European Search Report dated May 27, 2010 in corresponding European Application No. 07741528.
International Search Report mailed Jun. 19, 2007 for International Application No. PCT/JP2007/058092.

* cited by examiner

CONSTANT VELOCITY UNIVERSAL JOINT

BACKGROUND OF THE INVENTION (1) Field of the Invention

The present invention relates to a fixed or slide-type constant velocity universal joint used in a power transmission system in automobiles and various industrial machineries. The fixed-type or slide-type constant velocity universal joint is mounted on a drive shaft or a propeller shaft used in, for example, a front-engine, front-wheel drive (FF) vehicle, a four-wheel drive (4WD) vehicle, and a front-engine, rear-wheel drive (FR) vehicle.

(2) Description of Related Art

A drive shaft of an automobile has a configuration in which a slide-type constant velocity universal joint is mounted on one axial end of the shaft and a fixed constant velocity universal joint is mounted on another axial end.

A tripod constant velocity universal joint (TJ) that is a slide-type constant velocity universal joint used as a connecting joint of the drive shaft includes an outer joint component (outer member), an inner joint component (tripod member), and a rolling element (roller) as main components. In the outer joint component, three track grooves are formed on an inner circumferential surface in an axial direction, and a roller guiding surface is provided in the axial direction on both sides of each track groove. The inner joint component includes three leg shafts projecting in a radial direction. The rolling element is housed between the leg shafts of the inner joint component and the roller guiding surfaces of the outer joint component so as to rotate freely.

A Birfield constant velocity universal joint (BJ) that is a fixed constant velocity universal joint includes an outer joint component (outer member), an inner joint component (inner member), a plurality of balls, and a cage as main components. In the outer joint component, a plurality of track grooves are formed on an inner spherical surface along an axial direction, the track grooves being equal distances apart in a circumferential direction. In the inner joint component, a plurality of track grooves forming pairs with the track grooves on the outer joint component are formed on an outer spherical surface along the axial direction, the track grooves being equal distances apart in a circumferential direction. The plurality of balls that transmit torque are interposed between the track grooves on the outer joint component and the track grooves on the inner joint component. A cage that holds the balls is interposed between the inner spherical surface of the outer joint component and the outer spherical surface of the inner joint component.

A configuration in which an axial end outer diameter of the shaft is pressed into an axis hole inner diameter of the inner joint component is used as a connection configuration between the slide-type constant velocity universal joint or the fixed constant velocity universal joint, and the shaft. A female spline is formed on the axis hole inner diameter of the inner joint component as a recess and a projection running along the axial direction, and a male spline is formed on the axial end outer diameter of the shaft.

A hardening process by, for example, induction hardening or carburizing and quenching is performed on the axis hole inner diameter of the inner joint component on which the female spline is formed and on the axial end outer diameter of the shaft on which the male spline is formed, thereby forming hardened layers. Strength of the axis hole inner diameter of the inner joint component and the axial end outer diameter of the shaft is ensured by the hardened layers being formed.

The axial end outer diameter of the shaft is pressed into the axis hole inner diameter of the inner joint component, and the male spline and the female spline mesh. As a result, the shaft is fitted into the inner joint component. As a result of spline engagement between the shaft and the inner joint component, torque can be transmitted therebetween (refer to, for example, FIG. 2 in Patent Document 1, Japanese Patent Laid-Open Publication No. 2003-314580).

In a connection configuration between the inner joint component and the shaft such as this, there is a configuration in which a stopper ring with a round cross-section attached to the axial end of the shaft comes into contact with a locking surface provided on the inner joint component, thereby serving as a dislocation stopper (refer to, for example, Patent Document 2, Japanese Patent Laid-Open Publication No. Heisei 8-68426).

Patent Document 1: Japanese Patent Laid-Open Publication No. 2003-314580

Patent Document 2: Japanese Patent Laid-Open Publication No. Heisei 8-68426

BRIEF SUMMARY OF THE INVENTION

Problems to be Solved by the Invention

In the above-described constant velocity universal joint, the hardening-processed female spline is formed on the axis hole inner diameter of the inner joint component. The hardening-processed male spline is formed on the axial end outer diameter of the shaft. As a result, the axial end outer diameter of the shaft presses into the axis hole inner diameter of the inner joint component, and spline engagement is performed.

However, the engagement configuration is a recess and projection engagement by the hardening-processed female spline and the hardening-process male spline. Therefore, there is a problem in that backlash easily occurs. When a backlash such as this is present, it becomes difficult to transmit rotational torque with accuracy. In addition, there is also risk of abnormal noise occurring.

When the dislocation stopper is provided by the stopper ring in the connection configuration between the inner joint component and the shaft, a process for forming a locking surface on the inner joint component is required, thereby causing an increase in the number of processes. Moreover, because the stopper ring is required, the number of components increases and product cost rises. In an assembly process for the constant velocity universal joint as well, a process for mounting the stopper ring is required, causing an increase in product cost. Additional cycle time is also required.

The present invention is proposed in light of the above-described issues. An object of the present invention is to provide a constant velocity universal joint in which backlash does not easily occur, and an inner joint component and a shaft can be firmly connected.

Means for Solving the Problems

As a technical means for achieving the above-described object, the present invention is a constant velocity universal joint including an outer joint component, an inner joint component, and a shaft pressed into an axis hole inner diameter of the inner joint component. In the constant velocity universal joint, the axis hole inner diameter of the inner joint component is unhardened. A recess and projection section running along a circumferential direction is formed on an axial end outer diameter of the shaft, and a hardened layer is formed on the axial end outer diameter. The shaft and the inner joint component are plastic joined by an axial end of the shaft being pressed into the axis hole inner diameter of the inner joint component to incuse a shape of said recess and projection section onto the axis hole inner diameter of the inner joint component. The axis hole inner diameter of the inner joint component is preferably formed by cold forging finish.

In the present invention, the inner diameter of the inner joint component is unhardened. The recess and projection section running along the circumferential direction is formed on the axial end outer diameter of the shaft, and the hardened layer is formed on the axial end outer diameter. When the axial end of the shaft is pressed into the axis hole inner diameter of the inner joint component, the recess and projection section on the axial end outer diameter of the shaft on which the hardened layer is formed wedges into the unhardened axis hole inner diameter of the inner joint component, causing plastic deformation or incuse of the axis hole inner diameter of the inner joint component.

As a result of plastic joining or incuse between the shaft and the inner joint component in this way, the shaft and the inner joint component are integrated. Therefore, backlash between the shaft and the inner joint component is eliminated, and the shaft and the inner joint component can be firmly connected.

In the constant velocity universal joint of the present invention, at least one of either the axis hole inner diameter of the inner joint component or the axial end outer diameter of the shaft has a tapered shape in which a diameter decreases towards a press-fitting direction. The shaft and the inner joint component are plastic joined by the axial end outer diameter of the shaft being pressed into the axis hole inner diameter of the inner joint component. The axis hole inner diameter of the inner joint component is preferably formed by cold forging finish.

In the present invention, the axis hole inner diameter of the inner joint component is unhardened. The recess and projection section running along the circumferential direction is formed on the axial end outer diameter of the shaft, and the hardened layer is formed on the axial end outer diameter. When the axial end outer diameter of the shaft is pressed into the axis hole inner diameter of the inner joint component, the recess and projection section on the axial end outer diameter of the shaft on which the hardened layer is formed wedges into the unhardened axis hole inner diameter of the inner joint component, causing plastic deformation or incuse of the axis hole inner diameter of the inner joint component.

At this time, at least one of either the axis hole inner diameter of the inner joint component or the axial end outer diameter of the shaft has the tapered shape in which the diameter decreases towards the press-fitting direction. The above-described "at least one of either" indicates any one of an aspect in which the axis hole inner diameter of the inner joint component has the tapered shape, an aspect in which the axial end outer diameter of the shaft has the tapered shape, and an aspect in which the axis hole inner diameter of the inner joint component and the axial end outer diameter of the shaft both have the tapered shape.

When the axis hole inner diameter of the inner joint component has the tapered shape in which the diameter decreases towards the press-fitting direction, the plastic deformation of the axis hole inner diameter of the inner joint component on a counter press-fitting side can be made greater than that on a press-fitting side. When the axial end outer diameter of the shaft has the tapered shape in which the diameter decreases towards the press-fitting direction, the plastic deformation of the axis hole inner diameter of the inner joint component on the press-fitting side can be made greater than that on the counter press-fitting side.

As a result of plastic joining between the shaft and the inner joint component in this way, the shaft and the inner joint component are integrated. Therefore, backlash between the shaft and the inner joint component is eliminated, and the shaft and the inner joint component can be firmly connected.

In the above-described configuration, when the axis hole inner diameter of the inner joint component has the tapered shape in which the diameter decreases towards the press-fitting direction, an axis hole inner diameter dimension of a counter press-fitting side end section of the inner joint component is preferably prescribed to be between a maximum diameter and a minimum diameter of the recess and projection section on the axial end outer diameter of the shaft. When the axial end outer diameter of the shaft has the tapered shape in which the diameter decreases towards the press-fitting direction, the axis hole inner diameter dimension of the inner joint component is preferably prescribed to be between a maximum diameter and a minimum diameter of a base section of the recess and projection section on the axial end outer diameter of the shaft. As a result, the axial end outer diameter of the shaft can be smoothly pressed into the axis hole inner diameter of the inner joint component. The shaft and the inner joint component can be plastic-engaged with certainty.

In the above-described configuration, the recess and projection section on the axial end outer diameter of the shaft has a recess and projection section running along an axial direction on at least a portion in the axial direction. In other words, the recess and projection section is only required to be formed on any of a tip section, a base section, or an intermediate section between the tip section and the base section in the axial direction. The recess and projection section can also be formed in the overall axial direction.

As a result of the recess and projection section running along the axial direction being provided, the recess and projection section serves to stop dislocation of the axial end outer diameter of the shaft from the axis hole inner diameter of the inner joint component. The shaft and the inner joint component can be more firmly connected. A configuration in which the above-described recess and projection section running in the axial direction is formed having a saw-tooth shape is ideal.

The recess and projection section on the axial end outer diameter of the shaft is preferably configured to have a notch formed on a tip of the axial end outer diameter. As a result, a notched end section can lock with an end surface of the inner joint component and stop dislocation of the shaft from the inner joint component.

Advantage of the Invention

In the present invention, the axis hole inner diameter of the inner joint component is unhardened. A recess and projection section running along a circumferential direction is formed on an axial end outer diameter of the shaft, and a hardened layer is formed on the axial end outer diameter. The shaft and the inner joint component are plastic joined by an axial end of the shaft being pressed into the axis hole inner diameter of the inner joint component. As a result, the shaft and the inner joint component are integrated. Therefore, backlash between the shaft and the inner joint component is eliminated, and the shaft and the inner joint component can be firmly connected. As a result, a constant velocity universal joint with high rigidity can be provided. Unlike a conventional constant velocity universal joint, because spline formation and hardening processes are not required to be performed on the axial hole inner diameter of the inner joint component, cost reduction can be achieved.

BRIEF DESCRIPTION OF THE DRAWINGS

FIG. 14b is a cross-sectional view taken along line D-D in FIG. 14a;

DETAILED DESCRIPTION OF THE INVENTION

Embodiments of the present invention will be hereinafter described in detail. According to the embodiments below, the present invention is applied to a fixed (Birfield-type) constant velocity universal joint (BJ) as an example. However, the present invention can also be applied to other fixed constant velocity universal joints, such as an undercut-free constant velocity universal joint (UJ). Moreover, the present invention can also be applied to a slide-type constant velocity universal joint, such as a cross groove constant velocity universal joint (U) and a double offset constant velocity universal joint (DOJ).

Figure 5:
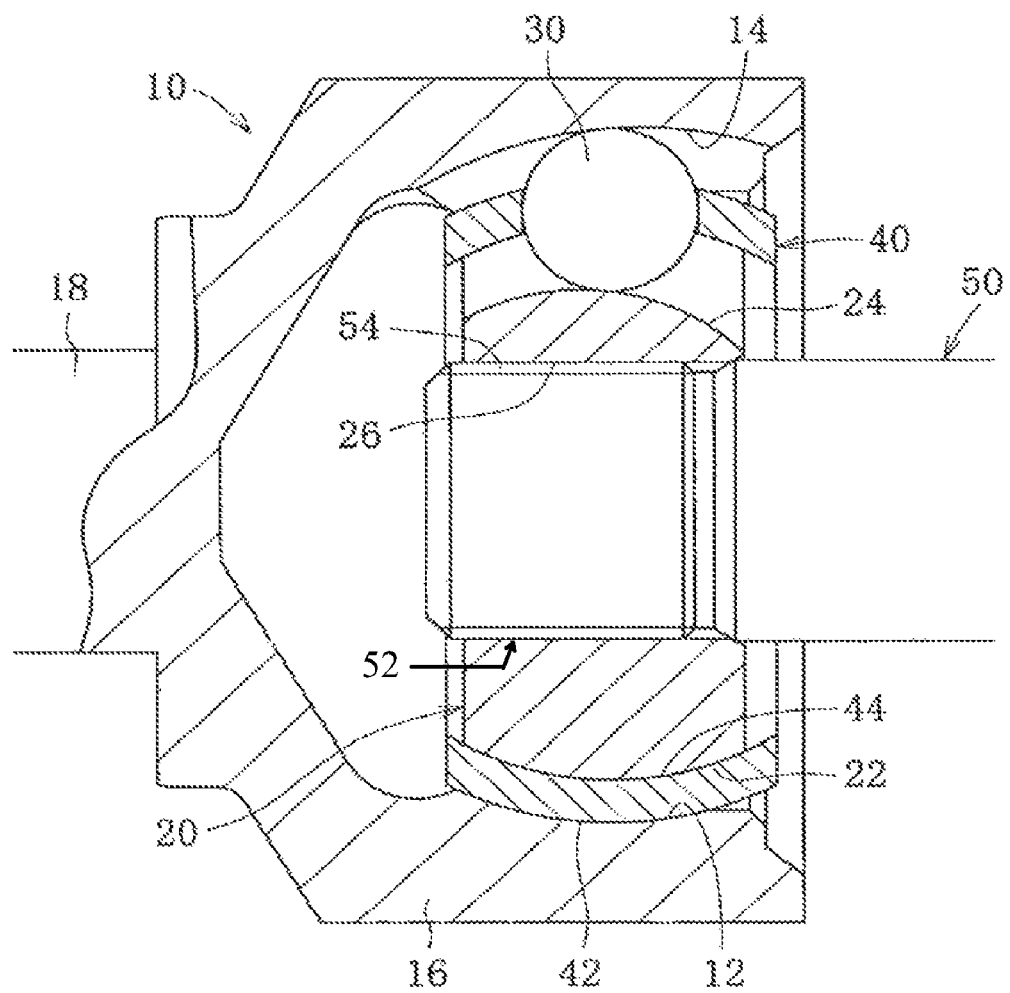
FIG. 5 is a cross-sectional view of an overall configuration of a fixed constant velocity universal joint (Birfield constant velocity universal joint)

FIG. 5 shows an example of an overall configuration of the Birfield constant velocity universal joint. The constant velocity universal joint includes an outer member 10, an inner member 20, a plurality of balls 30, and a cage 40 as main components. The outer member 10 serves as an outer joint component. The inner member 20 serves as an inner joint component placed within the outer member 10. The balls 30 are interposed between the outer member 10 and the inner member 20, and transmit torque. The cage 40 is interposed between the outer member 10 and the inner member 20, and holds the balls 30. When the fixed constant velocity universal joint is applied to a drive shaft, the outer member 10 is connected to a wheel bearing device (not shown). A shaft 50 is connected to the inner member 20 by an engagement configuration described hereafter As a result, torque can be transmitted at a constant speed even in a state in which rotation axes of the outer member 10 and the inner member 20 are at an angle.

The outer member 10 includes a mouth section 16 and a stem section 18. The outer member 10 is connected to the wheel bearing device at the stem section 18 in a manner allowing torque transmission. The mouth section 16 is shaped into a bowl that has an opening on one end. A plurality of track grooves 14 extending in an axial direction are formed on an inner spherical surface 12 of the mouth section 16, the track grooves 14 being equal distances apart in a circumferential direction. The track grooves 14 extend to the opening end of the mouth section 16. On an outer spherical surface 22 of the inner member 20, a plurality of track grooves 24 extending in the axial direction are formed, the track grooves 24 being equal distances apart in a circumferential direction. The track grooves 24 cut through in the axial direction of the inner member 20.

A track groove 14 on the outer member 10 and a track groove 24 on the inner member 20 form a pair. A ball 30, serving as a torque transmitting element, is mounted on each ball track configured by each pair of track groove 14 and track groove 24 in a manner allowing the ball 30 to roll. The ball 30 is interposed between the track groove 14 on the outer member 10 and the track groove 24 on the inner member 20 and transmits torque. The cage 40 is interposed between the outer member 10 and the inner member 20 in a slidable manner. The cage 40 comes into contact with the inner spherical surface 12 of the outer member 10 at an outer spherical surface 42 and comes into contact with the outer spherical surface 22 of the inner member 20 at an inner spherical surface 44.

The above-described inner member 20 is connected to the shaft 50 to allow torque transmission by an axial end 52 outer diameter of the shaft 50 being pressed into an axis hole inner diameter 26 (i.e. an axis hole) of the inner member 20. The axis hole inner diameter 26 of the inner member 20 is formed by cold forging finish. However, the axis hole inner diameter 26 can also be formed by turning and polish finishing. An engagement configuration between the inner member 20 and the shaft 50 is as described below.

Figure 1:
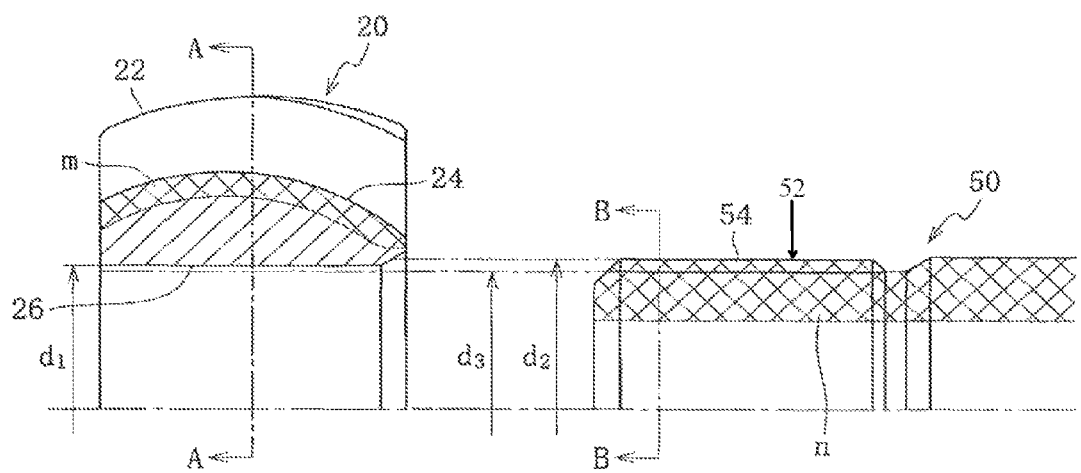
FIG. 1 is a cross-sectional view of a state before an inner member and a shaft are connected, according to a first embodiment of the present invention.
Figure 2:
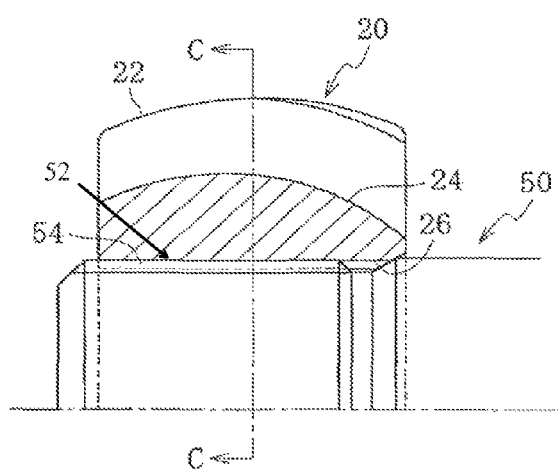
FIG. 2 is a cross-sectional view of a state after the inner member and the shaft are connected, according to the first embodiment of the present invention.
Figure 3A:
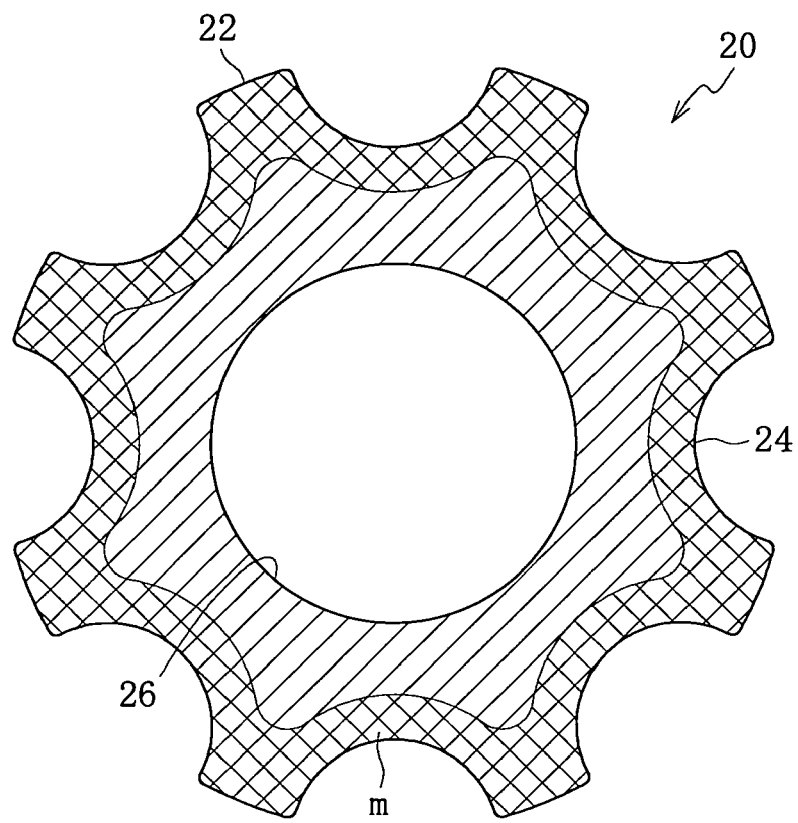
FIG. 3a is a cross-sectional view taken along line A-A in FIG. 1.
Figure 3B:
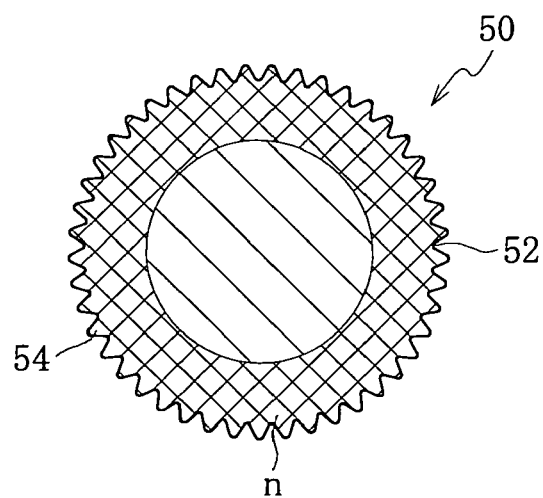
FIG. 3b is a cross-sectional view taken along line B-B in FIG. 1.
Figure 4:
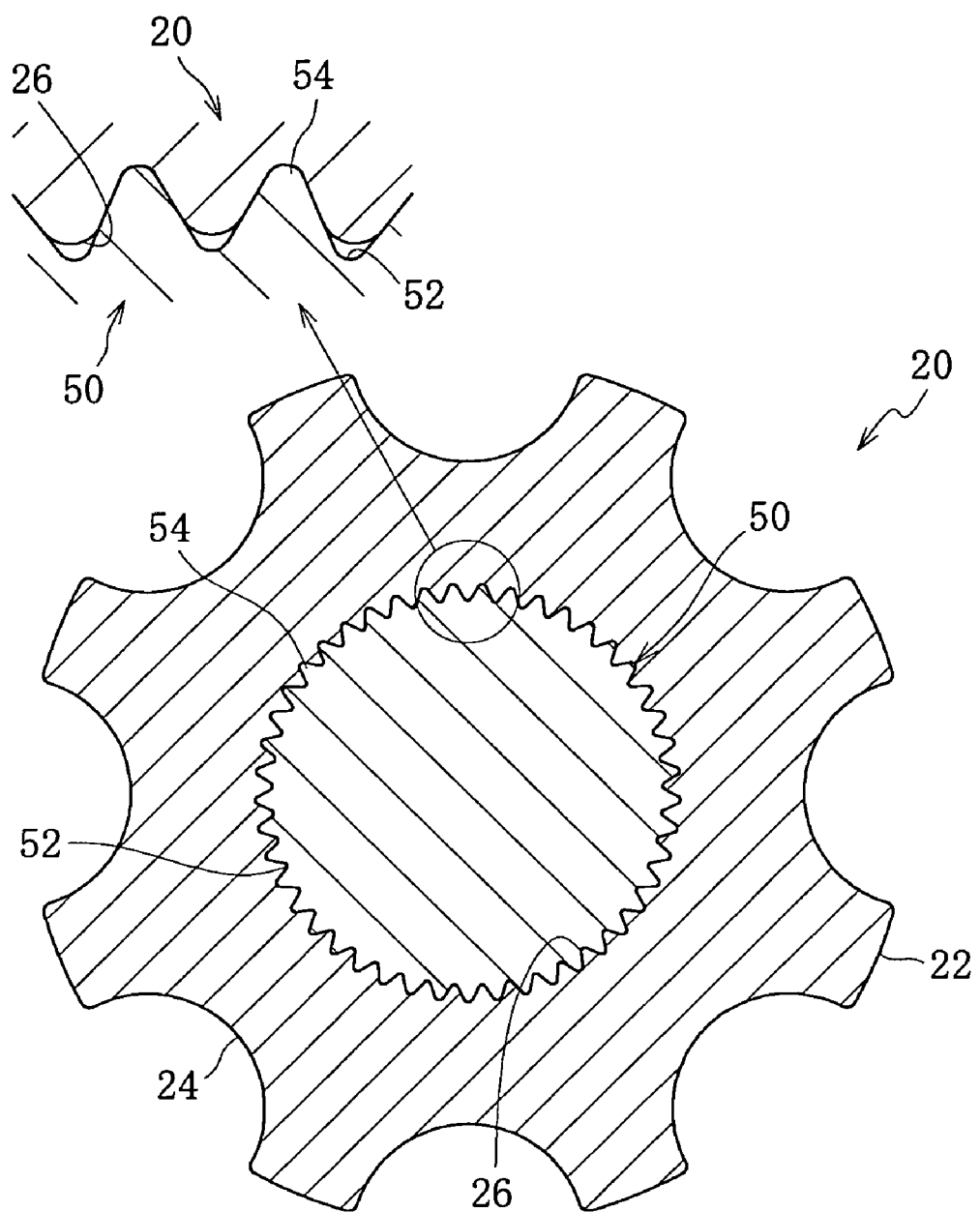
FIG. 4 is a cross-sectional view taken along line C-C in FIG. 2.

FIG. 1 shows a state before the inner member 20 and the shaft 50 are connected. FIG. 2 shows a state after the inner member 20 and the shaft 50 are connected. FIG. 3a is a cross-sectional view taken along line A-A in FIG. 1. FIG. 3b is a cross-sectional view taken along line B-B. FIG. 4 is a cross-sectional view taken along line C-C in FIG. 2.

In the inner member 20, a hardened layer m (cross-hatched areas in FIG. 1) is formed on the track grooves 24 and the outer spherical surfaces 22 between the track grooves 24 by induction hardening. The axis hole inner diameter 26 is unhardened. In other words, a hardening process by induction hardening is not performed on the axis hole inner diameter 26 of the inner member 20. Other than induction hardening, the hardened layer m on the inner member 20 can be formed by carburizing and quenching. In this case, the axis hole inner diameter 26 can be unhardened by anti-cementation processing.

At the same time, a hardened layer n (cross-hatched area in FIG. 1) is formed over an entire circumference of an outer diameter of the shaft 50 in the axial direction by induction hardening. A spline 54 is formed on the axial end outer diameter 52 of the shaft 50 as a recess and projection section running along the circumferential direction. As a result, the spline 54 that is hardened by induction hardening is formed on the axial end outer diameter 52 of the shaft.

As described above, the axis hole inner diameter 26 of the inner member 20 is in an unhardened state. The hardened spline 54 is formed on the axial end outer diameter 52 of the shaft 50. An axis hole inner diameter dimension $d_1$ of the inner member 20 is prescribed to be between a maximum diameter $d_2$ and a minimum diameter $d_3$ of the axial end outer diameter 52 of the shaft 50 at the spline 54.

As shown in FIG. 2, the axial end outer diameter 52 of the shaft 50 is pressed into the axis hole inner diameter 26 of the inner member 20. As a result of the press-fitting, the spline 54 on the axial end outer diameter 52 of the shaft 50 on which the hardened layer n is formed wedges into the unhardened axis hole inner diameter 26 of the inner member, as shown in FIG. 4, causing plastic deformation of the axis hole inner diameter 26 of the inner member 20. As a result of plastic joining between the shaft 50 and the inner member 20 in this way, the shaft 50 and the inner member 20 are integrated. Therefore, backlash between the shaft 50 and the inner member 20 is eliminated, and the shaft 50 and the inner member 20 can be firmly connected.

According to a first embodiment described above, a configuration in which only the spline 54 that is the recess and projection section running along the circumferential direction is formed on the axial end outer diameter 52 of the shaft 50 is described. However, the present invention is not limited thereto. A configuration in which a recess and projection section running along the axial direction is added to the spline 54 can also be used. In a similar manner as that according to the above-described first embodiment, FIG. 6, FIG. 8, FIG. 10, FIG. 12, and FIG. 15 each show the state before the inner member 20 and the shaft 50 are connected. FIG. 7, FIG. 9, FIG. 11, FIG. 13, and FIG. 16 each show the state after the inner member 20 and the shaft 50 are connected. Sections that are the same as or similar to those according to the first embodiment, shown in FIG. 1 and FIG. 2, are given the same reference numbers. Redundant explanations are omitted.

Figure 6:
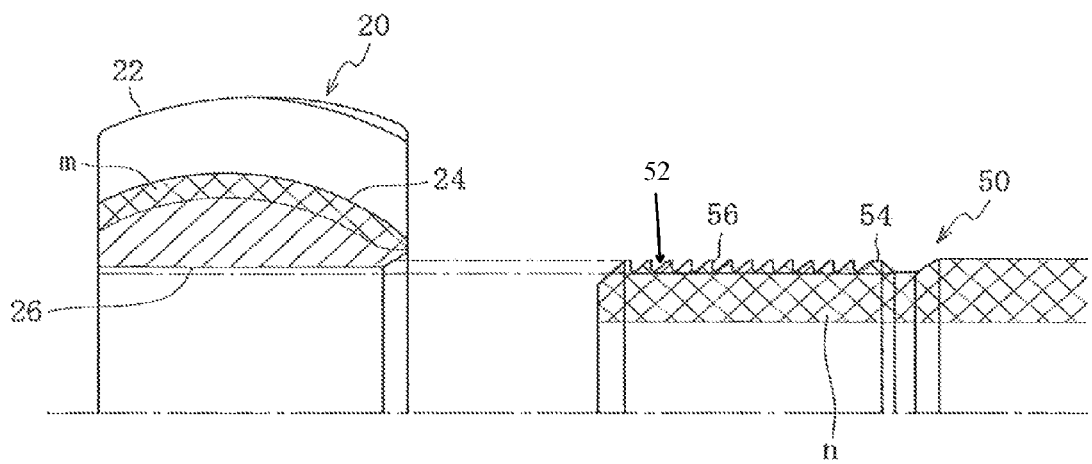
FIG. 6 is a cross-sectional view of a state before an inner member and a shaft are connected, according to a second embodiment of the present invention.

According to a second embodiment shown in FIG. 6, saw teeth 56 are formed on the spline 54 on the axial end outer diameter 52 of the shaft 50 as a recess and projection section running along the axial direction. In other words, projection-shaped tooth sections forming the spline 54 are formed in a saw-tooth shape running along the axial direction.

Figure 7:
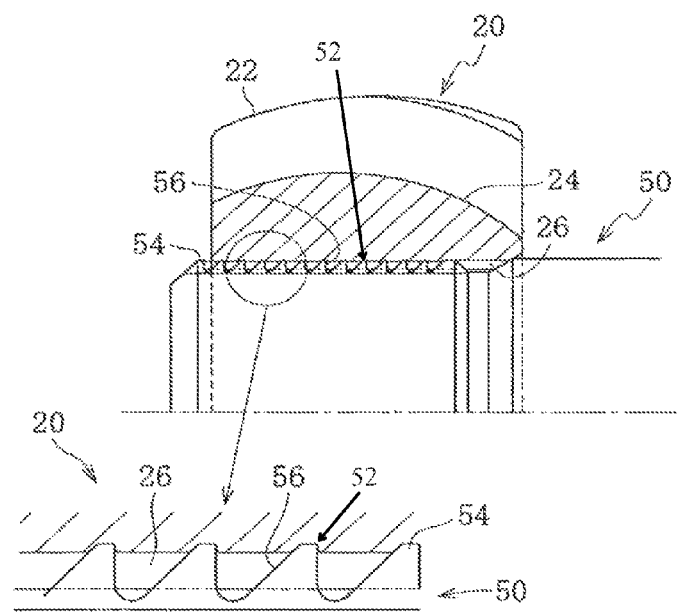
FIG. 7 is a cross-sectional view of a state after the inner member and the shaft are connected, according to the second embodiment of the present invention.

As shown in FIG. 7, when the axial end outer diameter 52 of the shaft 50 is pressed into the axis hole inner diameter 26 of the inner member 20, the spline 54 on the axial end outer diameter 52 of the shaft 50 on which the hardened layer n is formed wedges into the unhardened axis hole inner diameter 26 of the inner member 20, causing plastic deformation of the axis hole inner diameter 26 of the inner member 20 along the circumferential direction. In addition, the saw teeth 56 also wedge into the unhardened axis hole inner diameter 26 of the inner member 20, causing plastic deformation of the axis hole inner diameter 26 of the inner member 20 along the axial direction.

As a result of the saw teeth 56 running along the axial direction being formed as described above, the saw teeth 56 function as a dislocation stopper of the shaft 50 from the inner member 20. Therefore, a conventional stopper ring serving as a dislocation mechanism is not required. The number of components can be reduced and, because the inner member 20 is not required to be processed, cost increase does not occur. As a result of dislocation being stopped by the saw teeth 56, the shaft 50 and the inner member 20 can be more firmly connected.

Figure 8:
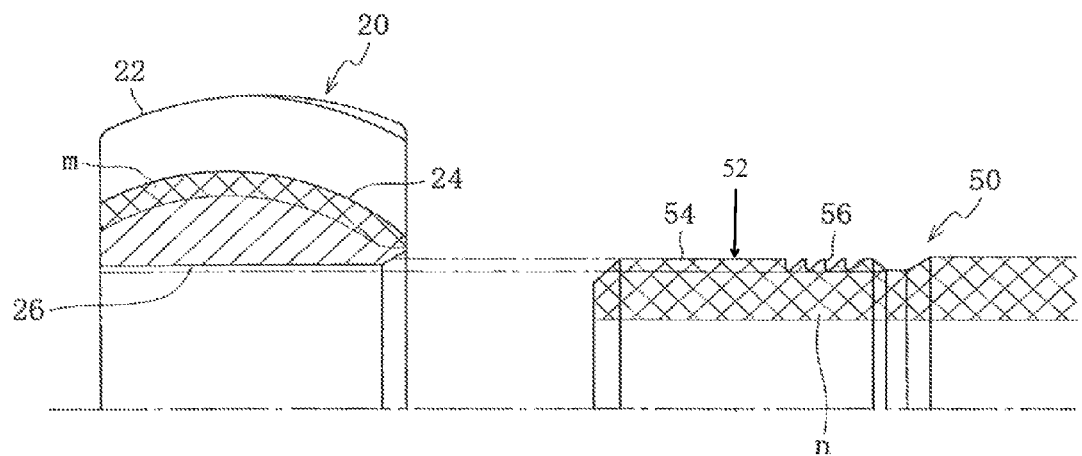
FIG. 8 is a cross-sectional view of a state before an inner member and a shaft are connected, according to a third embodiment of the present invention.
Figure 9:
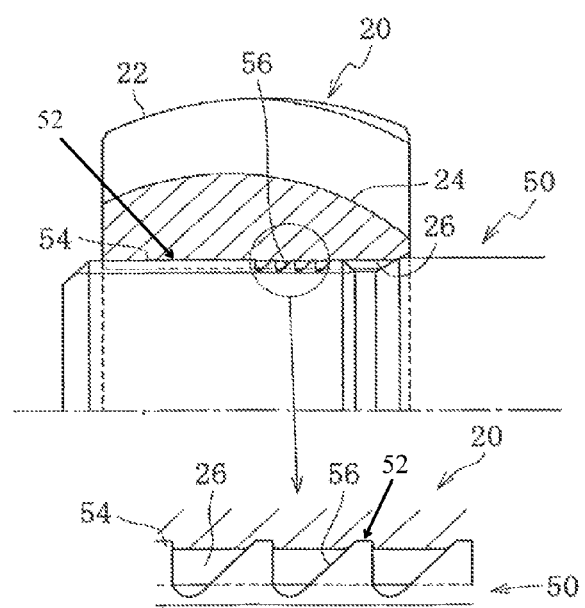
FIG. 9 is a cross-sectional view of a state after the inner member and the shaft are connected, according to the third embodiment of the present invention.
Figure 10:
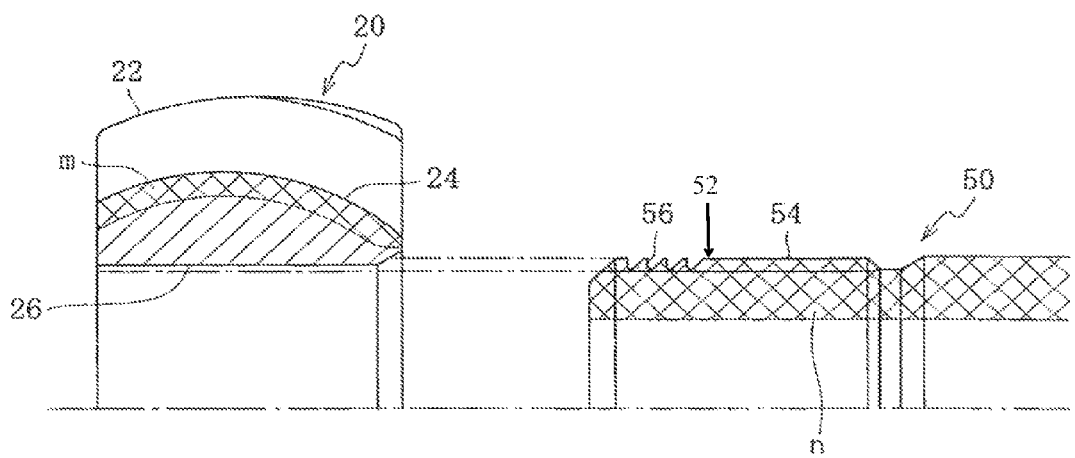
FIG. 10 is a cross-sectional view of a state before an inner member and a shaft are connected, according to a fourth embodiment of the present invention.
Figure 11:
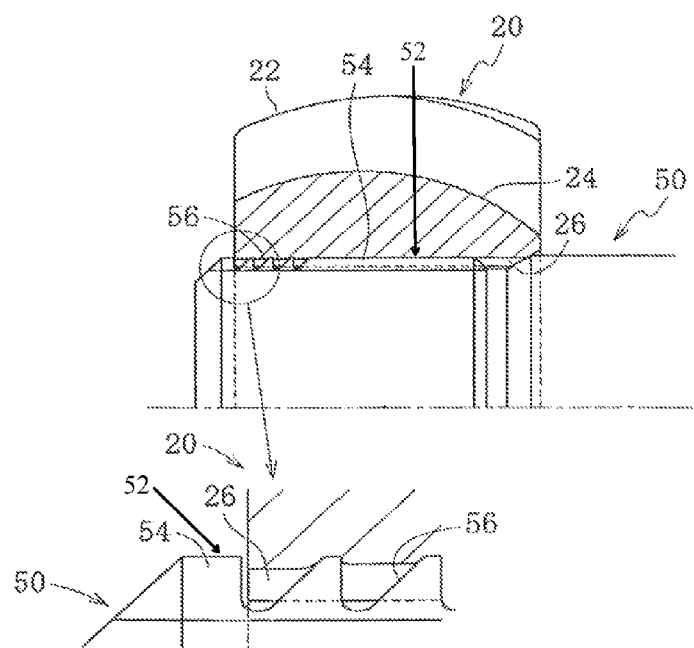
FIG. 11 is a cross-sectional view of a state after the inner member and the shaft are connected, according to the fourth embodiment of the present invention.
Figure 12:
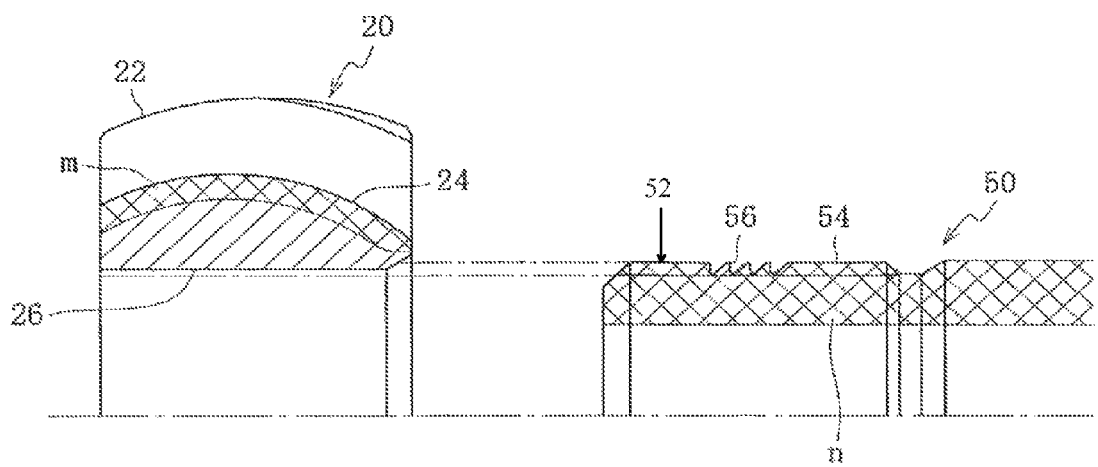
FIG. 12 is a cross-sectional view of a state before an inner member and a shaft are connected, according to a fifth embodiment of the present invention.
Figure 13:
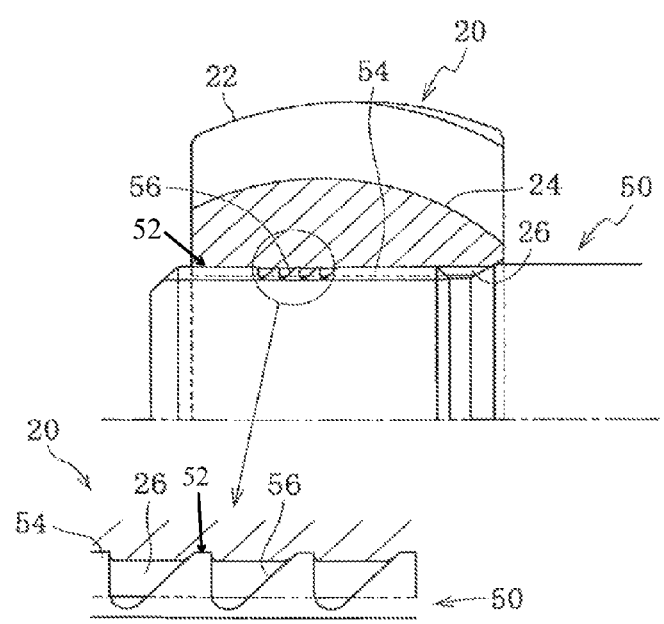
FIG. 13 is a cross-sectional view of a state after the inner member and the shaft are connected, according to the fifth embodiment of the present invention.

Aside from being formed over an overall axial direction of the spline 54, as according to the above-described second embodiment, a region at which the projection-shaped tooth sections of the spline 54 are formed in the saw-tooth shape running along the axial direction can be, for example, formed only on a base portion of the spline 54, as according to a third embodiment shown in FIG. 8 and FIG. 9. Alternatively, the region can be formed on a tip portion of the spline 54, as according to a fourth embodiment shown in FIG. 10 and FIG. 11, or only on an intermediate portion between the tip portion and the base portion, as according to a fifth embodiment shown in FIG. 12 and FIG. 13.

Figure 14A:
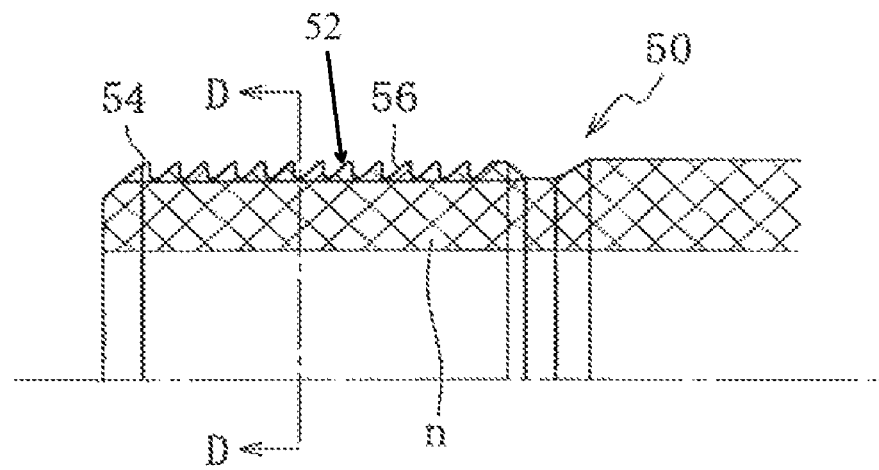
FIG. 14a is a partial front view of an axial end outer diameter of a shaft in a variation example in which a spline on the axial end outer diameter of the shaft has saw teeth.
Figure 14B:
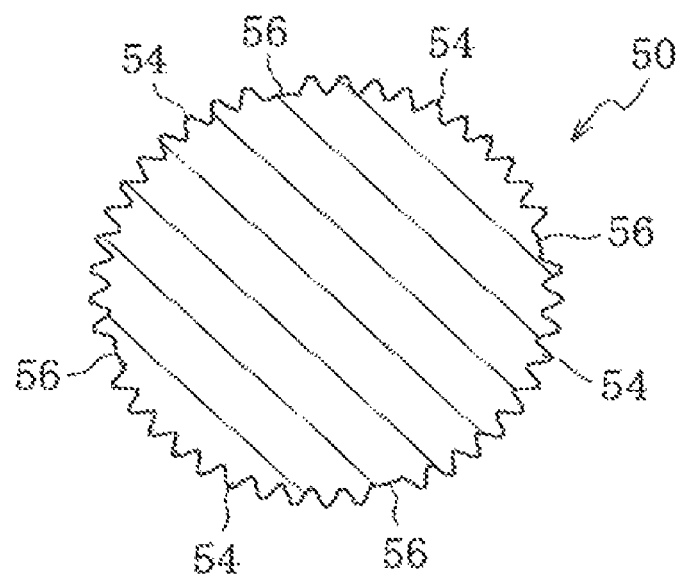

The saw teeth 56 are not necessarily required to be provided on all of the many projection-shaped tooth sections running along the circumferential direction of the spline 54. The saw teeth 56 can be provided on some of the many projection-shaped tooth sections running along the circumferential direction. For example, in an example shown in FIG. 14a and FIG. 14b, the saw teeth 56 are provided on four projection-shaped tooth sections of the spline 54 (four locations in FIG. 14b).

Figure 15:
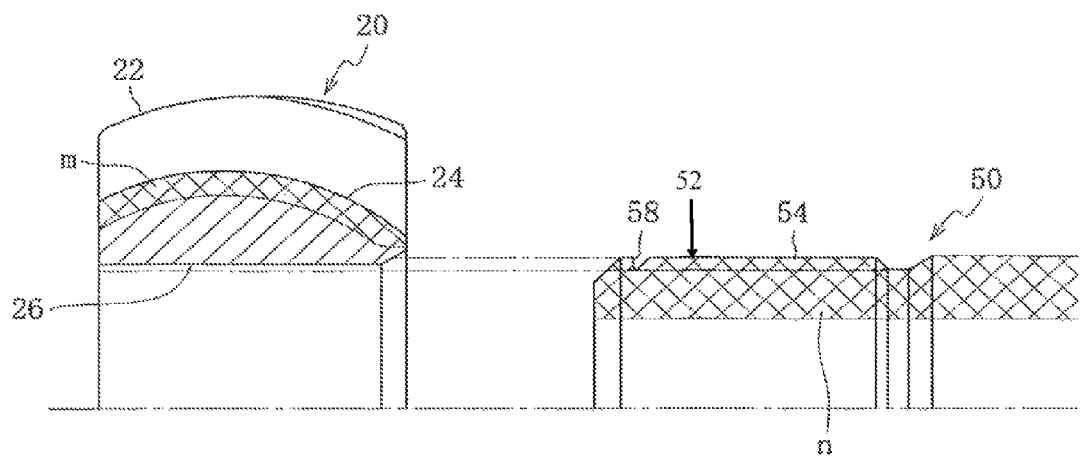
FIG. 15 is a cross-sectional view of a state before an inner member and a shaft are connected, according to a sixth embodiment of the present invention.
Figure 16:
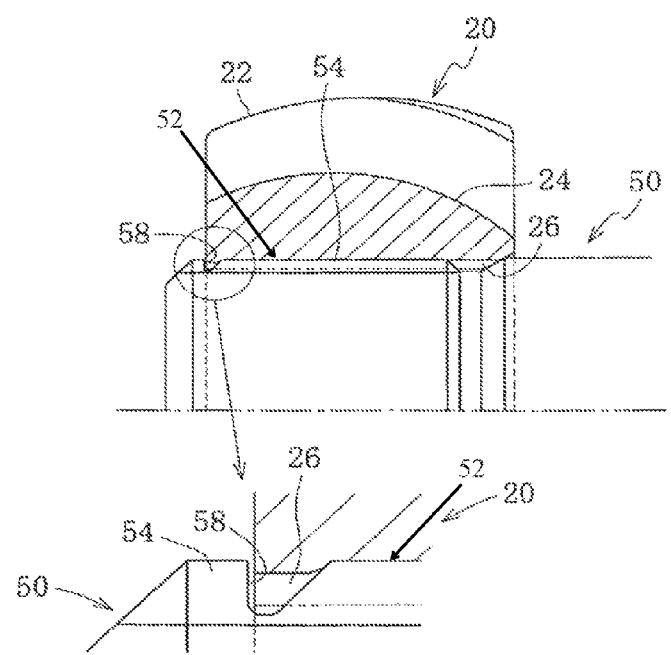
FIG. 16 is a cross-sectional view of a state after the inner member and the shaft are connected, according to the sixth embodiment of the present invention.

Moreover, as according to a sixth embodiment shown in FIG. 15, a notch 58 can be formed on the tip portion of the spline 54. When the notch 58 is formed in this way, when the axial end outer diameter 52 of the shaft 50 is pressed into the axis hole inner diameter 26 of the inner member 20, an end portion of the notch 58 can engage with an end surface of the inner member 20, serving to stop dislocation of the shaft 50 from the inner member 20. The engagement configuration between the inner member 20 and the shaft 50 becomes stronger. Similar operational effects can be achieved when the saw teeth 56 are formed on a region including the tip portion of the spline 54, as according to the above-described second embodiment (see FIG. 6 and FIG. 7) and fourth embodiment (see FIG. 10 and FIG. 11).

Figure 17:
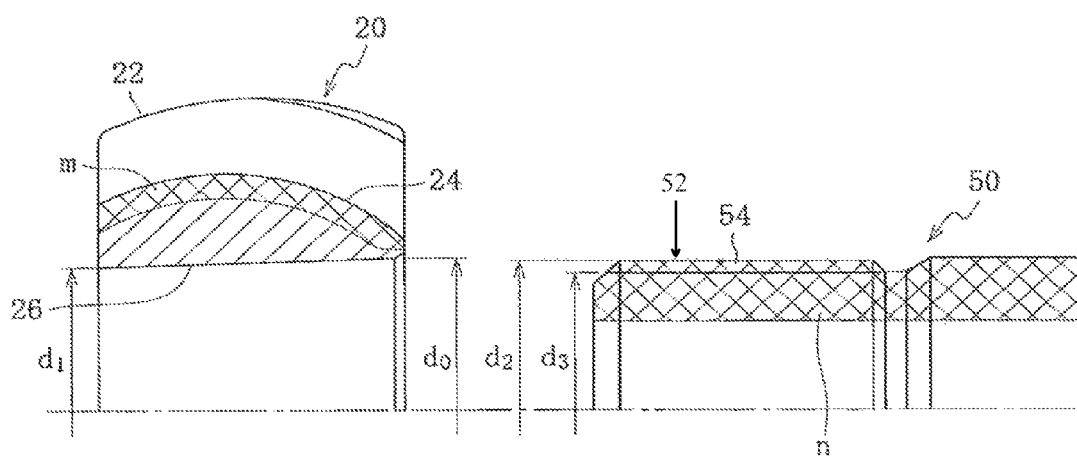
FIG. 17 is a cross-sectional view of a state before an inner member and a shaft are connected, according to a seventh embodiment of the present invention.
Figure 18:
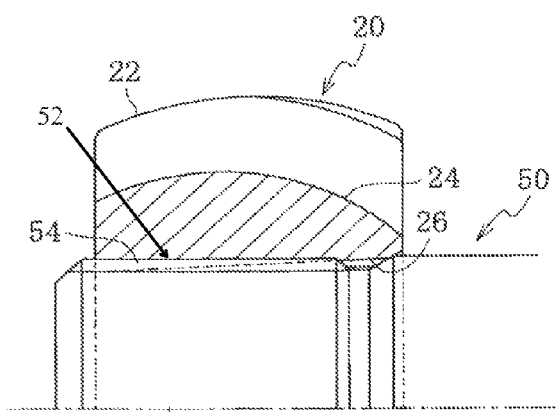
FIG. 18 is a cross-sectional view of a state after the inner member and the shaft are connected, according to the seventh embodiment of the present invention.

Next, a seventh embodiment of the present invention will be described. FIG. 17 and FIG. 18 show the seventh embodiment, in which the axis hole inner diameter 26 of the inner member 20 is tapered. In a manner similar to that according to the first embodiment, FIG. 17 shows the state before the inner member 20 and the shaft 50 are connected. FIG. 18 shows the state after the inner member 20 and the shaft 50 are connected. Sections that are the same as or similar to those according to the first embodiment, shown in FIG. 1 and FIG. 2, are given the same reference numbers. Redundant explanations are omitted.

According to the embodiment shown in FIG. 17 and FIG. 18, the axis hole inner diameter 26 of the inner member 20 has a tapered shape in which the diameter decreases towards a press-fitting direction (leftward direction in FIG. 17).

In other words, the axis hole inner diameter dimension $d_1$ at a counter press-fitting side end section of the inner member 20 is smaller than an axis hole inner diameter dimension $d_0$ at a press-fitting side end ($d_1 > d_1$). Moreover, the axis hole inner diameter dimension $d_1$ at the counter press-fitting side end section of the inner member 20 is prescribed to be between the maximum diameter $d_2$ and the minimum diameter $d_3$ of the spline 54 on the axial end outer diameter 52 of the shaft 50.

As shown in FIG. 18, the axial end outer diameter 52 of the shaft 50 is pressed into the axis hole inner diameter 26 of the inner member 20. As a result of the press-fitting, the spline 54 on the axial end outer diameter 52 of the shaft 50 on which the hardened layer n is formed wedges into the unhardened axis hole inner diameter 26 of the inner member, as shown in FIG. 4, causing plastic deformation of the axis hole inner diameter 26 of the inner member 20. At this time, as a result of the axis hole inner diameter 26 of the inner member 20 having the tapered shape in which the diameter decreases towards the press-fitting direction, the plastic deformation of the axis hole inner diameter 26 of the inner member 20 on the counter press-fitting side can be made greater than that on the press-fitting side.

As a result of plastic joining between the shaft 50 and the inner member 20 in this way, the shaft 50 and the inner member 20 are integrated. Therefore, backlash between the shaft 50 and the inner member 20 is eliminated, and the shaft 50 and the inner member 20 can be firmly connected.

Figure 19:
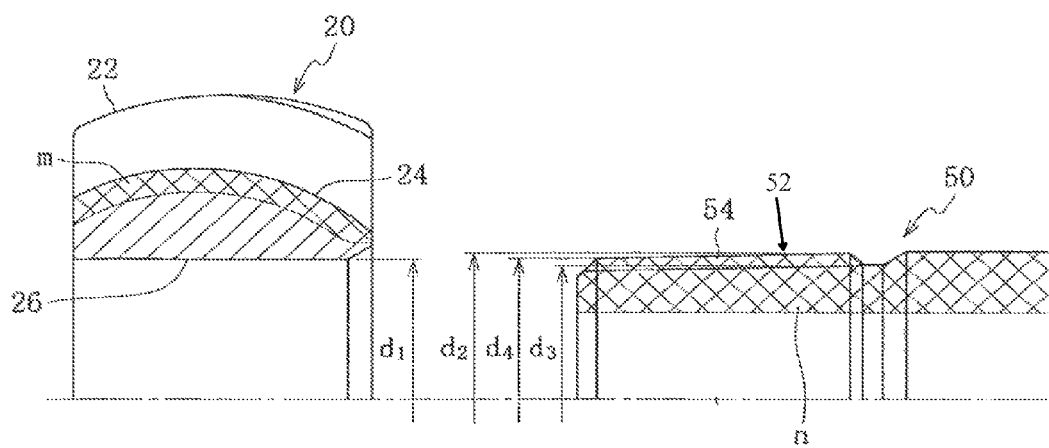
FIG. 19 is a cross-sectional view of a state before an inner member and a shaft are connected, according to an eighth embodiment of the present invention.
Figure 20:
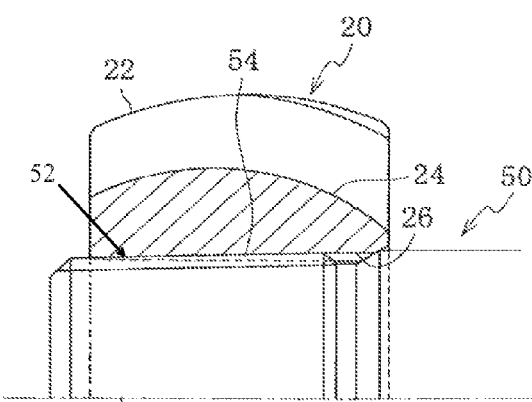
FIG. 20 is a cross-sectional view of a state after the inner member and the shaft are connected, according to the eighth embodiment of the present invention.

According to the above-described seventh embodiment, a configuration in which the axis hole inner diameter 26 of the inner member is tapered is described. However, the present invention is not limited thereto. Instead of the axis hole inner diameter 26 of the inner member 20 being tapered, the axial end outer diameter 52 of the shaft 50 can be tapered. An eighth embodiment in which the axial end outer diameter 52 of the shaft 50 is tapered is shown in FIG. 19 and FIG. 20. In a manner similar to those according to the above-described embodiments, FIG. 19 shows the state before the inner member 20 and the shaft 50 are connected. FIG. 20 shows the state after the inner member 20 and the shaft 50 are connected. Sections that are the same as or similar to those according to the first embodiment, shown in FIG. 1 and FIG. 2, are given the same reference numbers. Redundant explanations are omitted.

According to the embodiment shown in FIG. 19, the axial end outer diameter 52 of the shaft 50 has a tapered shape in which the diameter decreases in the press-fitting direction (leftward direction in FIG. 19). In other words, an outer diameter dimension $d_4$ at a spline tip side portion is smaller than an outer diameter dimension $d_2$ at a spline base side portion on the axial end outer diameter 52 of the shaft 50 ($d_2 > d_4$). Moreover, the axis hole inner diameter dimension $d_1$ of the inner member 20 is prescribed to be between the maximum diameter $d_2$ and the minimum diameter $d_3$ of the spline 54 on the axial end outer diameter 52 of the shaft 50.

As shown in FIG. 20, the axial end outer diameter 52 of the shaft 50 is pressed into the axis hole inner diameter 26 of the inner member 20. As a result of the press-fitting, the spline 54 on the axial end outer diameter 52 of the shaft 50 on which the hardened layer n is formed wedges into the unhardened axis hole inner diameter 26 of the inner member, as shown in FIG. 4, causing plastic deformation of the axis hole inner diameter 26 of the inner member 20. At this time, as a result of the axial end outer diameter 52 of the shaft 50 having the tapered shape in which the diameter decreases towards the press-fitting direction, the plastic deformation of the axis hole inner diameter 26 of the inner member 20 on the press-fitting side can be made greater than that on the counter press-fitting side.

As a result of plastic joining between the shaft 50 and the inner member 20 in this way, the shaft 50 and the inner member 20 are integrated. Therefore, backlash between the shaft 50 and the inner member 20 is eliminated, and the shaft 50 and the inner member 20 can be firmly connected.

According to the two embodiments described above, configurations in which either the axis hole inner diameter 26 of the inner member 20 or the axial end outer diameter 52 of the shaft 50 is tapered are described. However, the present invention is not limited thereto. The axis hole inner diameter 26 of the inner member 20 and the axial end outer diameter 52 of the shaft 50 can both be tapered.

According to each of the above-described embodiments, when the present invention is applied to a constant velocity universal joint of a drive shaft is described. However, the present invention is not limited thereto. The present invention can also be applied to a constant velocity universal joint of a propeller shaft.

The present invention is not limited to the above-described embodiments. Various modifications can be made within a scope of the spirit of the present invention. The scope of the present invention is indicated by the scope of claims, and includes equivalent meanings described within the scope of claims and all modifications within the scope.

The invention claimed is:

1. A constant velocity universal joint comprising:
   an outer joint component;
   an inner joint component having an axis hole; and
   a shaft pressed into the axis hole of the inner joint component,
   wherein an inner surface of the inner joint component around the axis hole is unhardened,
   wherein a recess and projection section extending along a circumferential direction is formed on an axial end of the shaft and a hardened layer is formed on a radially outward portion of the axial end of the shaft,
   wherein the shaft has a solid core at the recess and projection section,
   wherein the axial end of the shaft is press-fitted into the axis hole of the inner joint component such that the recess and projection section is wedged into the inner surface of the axis hole of the inner joint component by which the inner surface is plastically deformed and a plastic coupling of the shaft and the inner joint component is completed.

2. The constant velocity universal joint according to claim 1, wherein at least one of the axis hole of the inner joint component and the axial end of the shaft has a tapered shape in which a diameter decreases towards a press-fitting direction.

3. The constant velocity universal joint according to claim 2, wherein the axis hole of the inner joint component has the tapered shape in which the diameter decreases towards the press-fitting direction, and an axis hole inner diameter dimension at a counter press-fitting side end section of the inner joint component is between a maximum diameter and a minimum diameter of the recess and projection section on the axial end of the shaft.

4. The constant velocity universal joint according to claim 3, wherein the inner surface of the inner joint component is formed by cold forging.

5. The constant velocity universal joint according to claim 3, wherein an axis hole inner diameter dimension of the inner joint component is between a maximum diameter and a minimum diameter of the recess and projection section of the axial end of the shaft.

6. The constant velocity universal joint according to claim 3, wherein the recess and projection section of the axial end extends in an axial direction on at least a portion of the shaft.

7. The constant velocity universal joint according to claim 2, wherein the axial end of the shaft has the tapered shape in which the diameter decreases towards the press-fitting direction, and an axis hole inner diameter dimension of the inner joint component is between a maximum diameter and a minimum diameter of a base section of the recess and projection section on the axial end of the shaft.

8. The constant velocity universal joint according to claim 7, wherein the inner surface of the inner joint component is formed by cold forging.

9. The constant velocity universal joint according to claim 7, wherein an axis hole inner diameter dimension of the inner joint component is between a maximum diameter and a minimum diameter of the recess and projection section of the axial end of the shaft.

10. The constant velocity universal joint according to claim 7, wherein the recess and projection section of the axial end extends in an axial direction on at least a portion of the shaft.

11. The constant velocity universal joint according to claim 2, wherein the inner surface of the inner joint component is formed by cold forging.

12. The constant velocity universal joint according to claim 2, wherein an axis hole inner diameter dimension of the inner joint component is between a maximum diameter and a minimum diameter of the recess and projection section of the axial end of the shaft.

13. The constant velocity universal joint according to claim 2, wherein the recess and projection section of the axial end extends in an axial direction on at least a portion of the shaft.

14. The constant velocity universal joint according to claim 1, wherein the inner surface of the inner joint component is formed by cold forging.

15. The constant velocity universal joint according to claim 14, wherein an axis hole inner diameter dimension of the inner joint component is between a maximum diameter and a minimum diameter of the recess and projection section of the axial end of the shaft.

16. The constant velocity universal joint according to claim 14, wherein the inner joint component has track grooves and a hardened layer formed on the track grooves, and
wherein the hardened layer of the inner joint component is disposed directly radially outwardly of the recess and projection section of the shaft.

17. The constant velocity universal joint according to claim 1, wherein an axis hole inner diameter dimension of the inner joint component is between a maximum diameter and a minimum diameter of the recess and projection section of the axial end of the shaft.

18. The constant velocity universal joint according to claim 1, wherein the recess and projection section of the axial end extends in an axial direction on at least a portion of the shaft.

19. The constant velocity universal joint according to claim 18, wherein the recess and projection section extending along the axial direction of the shaft is formed having a saw-tooth shape.

20. The constant velocity universal joint according to claim 1, wherein the recess and projection section extending along the axial direction of the shaft has a notch formed on a tip of the axial end.

* * * * *